United States Patent [19]

Dischert et al.

[11] 4,218,699
[45] Aug. 19, 1980

[54] BLACK LEVEL CONTROL SYSTEM FOR A COLOR TELEVISION CAMERA

[75] Inventors: Robert A. Dischert, Burlington; Robert L. Libbey, Cherry Hill, both of N.J.

[73] Assignee: RCA Corporation, New York, N.Y.

[21] Appl. No.: 17,040

[22] Filed: Mar. 2, 1979

[30] Foreign Application Priority Data

May 12, 1978 [GB] United Kingdom ............... 12990/78

[51] Int. Cl.² .......................................... H04N 9/535
[52] U.S. Cl. .................................... 358/29; 358/39; 358/41
[58] Field of Search ................ 358/21, 10, 29, 39, 358/41, 210, 185, 170, 171

[56] References Cited

U.S. PATENT DOCUMENTS 3,808,358  4/1974  Schneider ................. 358/29

Primary Examiner—Robert L. Richardson
Attorney, Agent, or Firm—Eugene M. Whitacre; Paul J. Rasmussen; Robert L. Troike

[57] ABSTRACT

The individual red, green, and blue video white levels from a color television camera are maintained constant when the individual red, green, and blue black camera control levels are adjusted by the master black camera control by additively summing a first percentage of the selected master black level to the individual red, green, and blue black levels to form the final individual black levels and by subtracting a second percentage of the selected master black level from the individual red, green, and blue white levels selected by the individual red, green, and blue white level camera controls.

8 Claims, 1 Drawing Figure

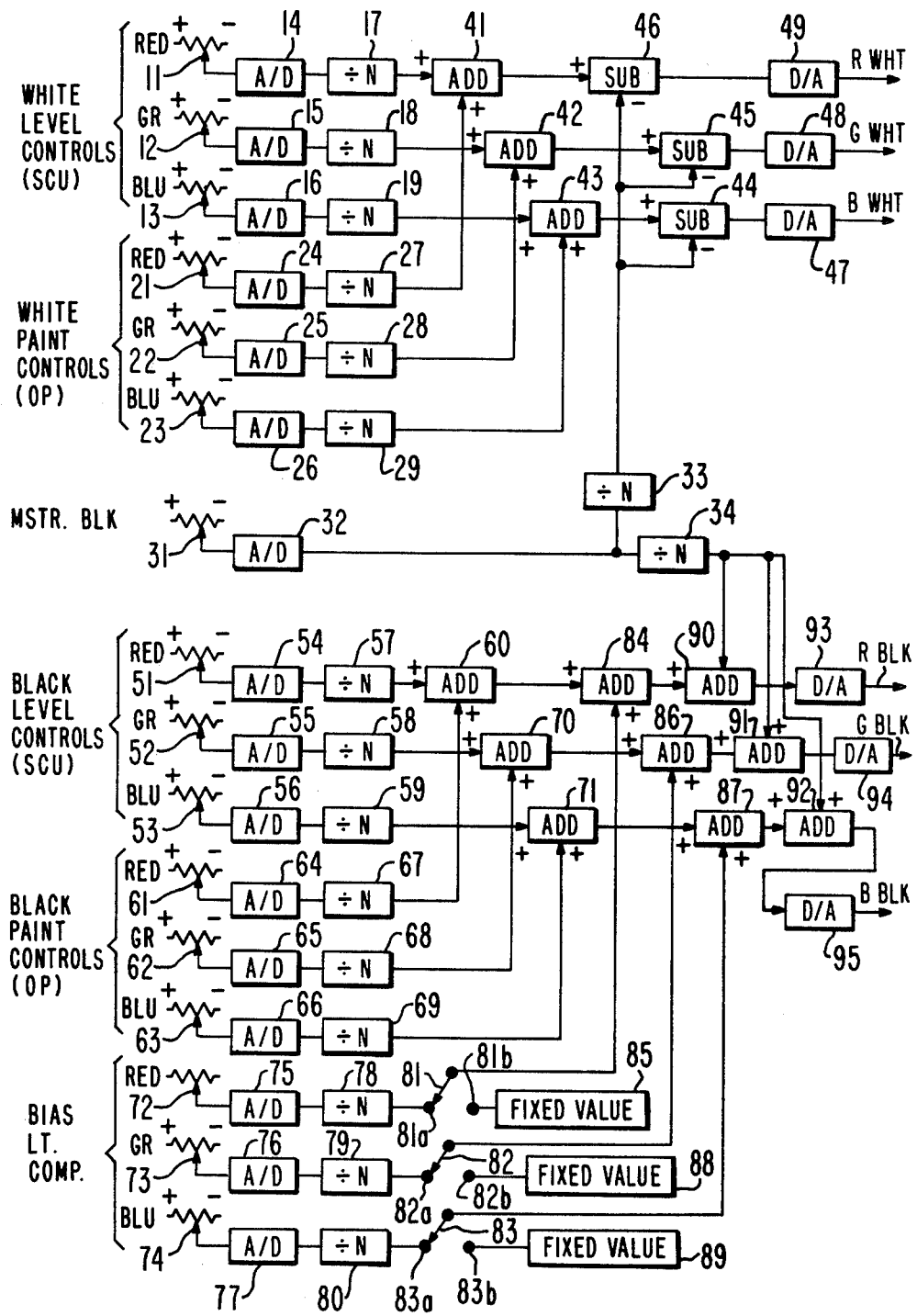

BLACK LEVEL CONTROL SYSTEM FOR A COLOR TELEVISION CAMERA

BACKGROUND OF THE INVENTION

A color television camera must have control of the individual red, green, and blue black levels, the individual red, green, and blue white levels and also a master control of all black levels. The master black level control should not, however, disturb the white levels in any way. To simply raise the black levels when adjusting for light conditions also proportionately raises all of the video levels the same percentage. The white level at the other extreme of the video which is set to provide the desired white level for the light conditions is raised by the raise in master black level. To raise the black levels alone requires, therefore, at the same time a reduction of the gain. In the past the white levels were maintained constant when the master black is changed by using non-linear amplifiers or by sampling a special white test pulse with a feedback servo AGC amplifier.

The non-linear amplifier does not provide a truly constant white level as the master black is adjusted and the feedback system tends to be complex and unstable. It is also desirable from a hardware point of view to make this system fit a digital format and be usable in a digital control system such as described in co-pending applications: Ser. No. 894,011, filed Apr. 6, 1978, entitled "TELEVISION CONTROL SYSTEM," and now U.S. Pat. No. 4,170,024 of Robert A. Dischert, Ser. No. 894,010, filed Apr. 6, 1978, entitled, "SETUP CONTROL UNIT FOR TELEVISION CAMERAS," and now U.S. Pat. No. 4,167,022 Thorpe et al, Ser. No. 894,009, filed Apr. 6, 1978, entitled, "CONTROL FOR A TELEVISION CAMERA," of Robert A. Dischert et al, and Ser. No. 894,008, filed Apr. 6, 1978, entitled "AUTOMATIC SETUP SYSTEM FOR TELEVISION CAMERAS," and now U.S. Pat. No. 4,158,208 of Robert A. Dischert.

SUMMARY OF THE INVENTION

A system for maintaining the individual white levels associated with the individual white level controls of a color camera when the master black control is adjusted includes an additive summer means coupled to the master black control for additively summing a first percentage of the selected master black level to each of the individual black level signals associated with the individual black level controls and a subtractor means for subtracting a percentage of the selected master black level from each of the individual white level signals to substantially maintain the selected individual white levels when the black levels are changed.

DESCRIPTION OF THE DRAWING

The FIGURE is a diagram of the control system according to the present invention.

DESCRIPTION OF THE INVENTION

Referring to the FIGURE, adjustable controls in 11, 12, and 13 are adjustable potentiometers for setting red, green, and blue white levels respectively. Voltages are coupled across these potentiometers and the selected position of the controls determines the voltage values applied to associated analog to digital (A/D) converters 14, 15, and 16. An A/D converter is associated with each of the controls. The adjustable red white level control 11 is shown coupled to A/D converter 14. The analog to digital (A/D) converter 14 converts these analog level signals to an 8-bit digital code for example which represents the selected amplitude level in binary form. These binary code signals are coupled to a divide by N digital divider 17. Although analog to digital converters are shown some controls may directly provide digital encoded levels without the use of separate converters. The green white level and the blue white level potentiometers 12 and 13 are each coupled to separate analog to digital converters 15 and 16 respectively and to separate divide by N dividers 18 and 19. The red, green, and blue white level controls may be located at the setup control unit (SCU), for example, when operating with a system as described in connection with application, Ser. No. 894,009, filed Apr. 6, 1978, entitled, "CONTROL SYSTEM FOR A TELEVISION CAMERA." Red, green, and blue white paint level controls are vernier white level controls and these are usually located in an operators console (OP). The separate red, green, and blue white paint level controls 21, 22, and 23 are each applied to respective analog to digital converters 24, 25, and 26. Voltages are applied across these potentiometers 21, 22, and 23 and the selected position of the controls determines the voltage values which are converted via the associated analog to digital converters to, for the example, 8-bit binary code signals representing the selected voltage levels. The 8bit binary signals from the white paint controls 21, 22, and 23 are applied to separate divide by N digital dividers 27, 28, and 29.

The master black level control which is located, for example, in the setup control unit (SCU) is provided by potentiometer 31. The potentiometer 31 has a potential thereacross and the selected position determines the analog level applied to an analog to digital converter 32. An 8-bit binary coded signal representing the master black level selected by control 31 is applied to divide by N divider 33 and over a separate path to separate divide by N divider 34.

At the camera or camera processor in the above cited system, these 8-bit binary control signals represent the control levels selected at the setup control unit, the operator's console and at the master black controls are summed in binary adders or subtractors to produce the final red, green, and blue white levels. The divide by N dividers 17, 18, 19, 27, 28, 29, and 33 provide only a certain percentage of that adjusted value from the potentiometers out of the dividers to the binary summing and subtracting means. The number N of the divider is usually on the order of 2, 4, 6, or 8. For example, a divide by 2 provides in binary form only half the level provided from the converter. A typical blue white level would be represented by the following equation:

$$\frac{\text{input white}}{2} + \frac{\text{white paint}}{4} + \frac{\text{master black}}{4} = \text{finish white level}$$

For this equation the divide by N divider 19 would be a divide by 2. Divide by N divider 29 will be a divide by 4. The divide by N divider 33 will be a divide by 4 so that when they are combined at the binary adder 43 and binary subtractor 44 which would be located, for example, in the camera processor, the equation above is satisfied. The binary adder 43 sums the outputs digitally and binary subtractor 44 provides a binary difference. The output from subtractor 44 is applied to a digital to analog converter 47 for the example of the blue white level control. The red and green white level signals are binary summed with the red and green paint level signals at binary adders 41 and 42 respectively. These red and green binary summed signals at adders 41 and 42 respectively are subtracted from the master black level setting via divider 33 at binary subtractors 46 and 45 and converted to analog signals via D/A converters 49 and 48 respectively. The percentages of white, white paint or master black can be adjusted by changing the divide by N value or by adjusting the potentiometer controls. A percentage of black level is cross mixed with the white level via divide by N digital divider 33 and binary subtractors 44, 45, and 46. In this manner, when the black level is raised via the divide by N device 33 by the movement of the potentiometer control 31 a percentage (¼ for the example) of that level is applied to each of the red, green, and blue white level via subtractors 44, 45, and 46. The binary subtractors cause each of the total white levels to be decreased this certain percent (determined from divide by N device 33) as the master black level is increased.

At the setup control unit are also the red, green, and blue black level potentiometers 51, 52, and 53 control. These controls are adjustable potentiometer controls with voltages coupled across these separate potentiometers and the selected position of the controls determines the voltage value applied to the separate analog to digital converters 54, 55, and 56. For example, the red black level control 51 is applied to analog to digital converter 54 to provide an 8-bit binary representation of the analog value selected at potentiometer control 51. The output from the analog to digital converter 54 is applied through a divide by N digital divider 57 which selects a certain percentage of the red black level and applies it to a binary adder 60.

Similarly, the green and blue black level signals from controls 52 and 53 are converted to binary signals at A/D converters 55 and 56 respectively and applied via binary dividers 58 and 59 to binary adders 70 and 71 respectively.

At the operator's console is located the vernier controls 61, 62, and 63 for red, green, and blue black levels. The red black paint control 61 for example is applied to analog to digital converter 64 which converts the selected amplitude level of the red black paint control to a digital binary representation of that level. This signal from the analog to digital converter 64 is applied to a binary divide by N divider 67. The output from the divide by N divider 67 is applied to the binary adder 60. The adder 60 may be located, for example, at the camera or camera processor where the red black level signals from the setup control unit and red black paint vernier controls from the operator's console are summed. Similarly, the green and blue black paint controls 62 and 63 are separately applied to separate A to D converters 65 and 66 and dividers 68 and 69 and summed with the corresponding red and green black levels from the setup control unit at binary adders 70 and 71. Depending upon the value of dividers 67 and 57 a certain selected percentage of red black paint and red black level for example is summed at the summer 60.

Similarly, the value of the dividers 58 and 68 determine the percentage of green black level and green black paint and the value of the dividers 59 and 69 determine the percentage of blue black level and blue black paint. At the setup control unit are located red, green, and blue bias light compensation control potentiometers 72, 73, and 74. The red bias light compensation control 72 which is a potentiometer with the voltage there across is coupled to an A to D converter 75 which converts the selected bias light compensation level signals to a 8-bit binary representation of that level. This digital signal representing the bias light compensation level selected is applied to a corresponding divide by N divider 78. Similarly, the green and blue bias light compensation controls 73 and 74 are coupled to respective A to D converters 76 and 77 and divide by N dividers 79 and 80. A switch with arm 81 is selected in either control position 81a or 81b depending upon whether or not the bias light compensation is "on" or "off". When the red bias light compensation is "on" switch 81 is in the contact position 81a, and a certain percentage of that selected level depending upon the divider 78 and the potentiometer setting 72 (for the example or the red bias light compensation level) is applied to binary adder 84. The adder 84 sums the output from the red black level, red black paint, (from adder 60) and the red bias level when the red bias light compensation is "on". If the bias light compensation is not used, the switch 81 is in the position 81b and a fixed digital number from fixed value source 85 representing a fixed level is entered to permit calculation and level selection. When the green bias light compensation is "on" switch 82 contacts terminal 82a and applies the percentage from divider 79 to binary adder 86 to sum with the output from adder 70. Similarly, the blue black level, blue black paint, and blue bias light compensation are combined via switch 83 at terminal 83a and binary adder 87. If the green and blue bias light compensation controls are not used for green and blue, both switches 82 and 83 contact terminals 82b and 83b respectively providing fixed value signals from sources 88 and 89.

The master black control value selected at control 31 and converted to binary signal at A/D converter 32 is applied to divide by N divider 34. This selected master black level from divider 34 is summed at binary adders 90, 91, and 92 with the individual red, green, and blue black levels from binary adders 84, 86, and 87 to form the final red, green, and blue black levels. These separate red, green, and blue black level binary signals are separately converted to separate final red, green, and blue black level signals via digital to analog (D/A) converters 93, 94, and 95. As can be seen viewing the FIGURE and from the foregoing description that as the black level is raised via control 31 the black level from the individual red, green, and blue black level adders 90, 91, and 92 is raised (due to summing action) and the red, green, and blue white levels from the white level subtractors 44, 45, and 46 respectively is decreased proportionately. The percentage of increase is a function of divider 34 and the percentage of decrease is a function of divider 33. Since white level is a gain factor and black level is an additive factor, the divider 33 and 34 may have different values.

The term "white paint" control as used herein refers to the operator's vernier or fine control of white level. Similarly, the "black paint" control refers to the operator's vernier control of the black level. The white paint and the black paint controls as mentioned are usually located at the operator's console while the red, green, and blue white levels and the red, green, and blue black levels are at the setup controls which are located on the setup console.

The above described system is particularly useful in connection with a type of camera containing digital storage device such as a RAM for storing the control values for the camera such as described in application Ser. No. 894,009, filed Apr. 6, 1978, entitled, "CONTROL SYSTEM FOR A TELEVISION CAMERA," of Robert A. Dischert et al. The memory in such a system described above may have two sections with two separate memories. One for filing and one for recall. In the process of going from one memory to the other these combining operations (the summing operations) can be made. These operations can also be performed in a memory where the writing-in and reading-out of the two locations and in the switching and processing between the two locations would include the processing described above. The switching and sequencing can be done using a microprocessor and a RAM. The analog to digital converters in the FIGURE for the system would include the RAM memory in the system of the cited case.

What is claimed is:

1. In a color television camera system having individual black level camera controls providing individual black level camera control signals and individual white level camera controls providing individual white level camera control signals and a master black level camera control providing a master black level camera control signal, a system for maintaining the individual white levels from the camera when the master black level camera control is changed, comprising:

first means coupled to said master black level control for additively summing a first percentage of the master black level signal to each of the individual black level signals, and second means coupled to said master black level control for subtracting a second percentage of the master black level signal from each of the individual white level signals to maintain the white levels when the master black level is charged.

2. The combination of claim 1 wherein said signals are binary signals and said first means includes a first binary divider and a binary adder for each of the individual black level controls, said first binary divider responsive to the master black level signal for providing said first percentage of the selected master black level signal to each of said binary adders.

3. The combination of claim 2 wherein said second means includes a second binary divider and a binary subtractor for each of the individual white level controls, said second binary divider responsive to the master black level signal for providing said second percentage of the selected master black level signal to each of said binary subtractors.

4. The combination of claim 3 including means coupled to said binary adders and binary subtractors for converting said binary signals to analog amplitude levels.

5. A system for setting the video level of a color television camera from main and vernier controls, comprising:

means responsive to said main control setting for providing a first binary digital signal representing the main control selected video level, means responsive to said vernier manual control setting for providing a second binary digital signal representing the vernier control selected video level, first digital divider means coupled to said first means and responsive to said first binary signal for providing a third binary signal representing a percentage of the main control selected video signal, second digital divider means coupled to said second means and responsive to said second binary signal for providing a fourth binary signal representing a percentage of the vernier control selected video level, means coupled to said first and second divider means for algebraically summing the third and fourth binary signals, and means coupled to said summing means for converting said binary signals to an amplitude level corresponding to the digital sum of said third and fourth binary signals to be applied to a camera video level control.

6. A system for setting the black signal level of a television camera having a black level control, black paint control, and bias light compensation control, comprising:

means responsive to the black level control for providing a first binary digital signal representing the selected black level, means responsive to the black paint control for providing a second binary digital signal representing the selected black paint level, means responsive to the bias light compensation control for providing a third binary digital signal representing the selected bias light compensation level, a first digital divider responsive to said first binary signal for providing a fourth binary signal representing a percentage of the selected black level, second digital divider means responsive to said second binary signal for providing a fifth binary signal representing a percentage of the selected black paint level, first binary additive means for additively summing said fourth and fifth binary signals to provide a sixth binary signal, a third digital divider responsive to the third binary signals for providing a seventh binary signal representing a percentage of the selected bias light compensation level, and a second binary additive means coupled to said third divider and said first additive means for additively summing said sixth and seventh binary signals to provide a black level signal.

7. The combination of claim 6 including a master black level control and means coupled to said second additive means responsive to said master black level setting for additively summing a percentage of the master black level setting to said additively summed black levels, black paint levels and bias compensation levels for providing a total black level signal.

8. A system for setting the black and white video levels of a television camera having a white level control, a white paint control, and a master black level control, comprising:

first means responsive to the white level control for providing a first binary digital signal representing the selected white level, second means responsive to the white paint control for providing a second binary digital signal representing the selected white paint level, third means responsive to the master black level control for providing a third binary digital signal representing the selected master black level, a first digital divider coupled to said first means for providing a fourth binary signal representing a predetermined percentage of the selected white level, a second digital divider means coupled to said second means for providing a fifth binary signal representing a percentage of the selected white paint level, a third digital divider means coupled to said third means for providing a sixth binary signal representing a first percentage of the selected master black level, additive summing means coupled to said first and second divider outputs for additively summing said fourth and fifth binary signals representing percentages of white level and white paint level for providing a seventh binary signal, digital subtracting means coupled to said additive summing means and said third divider means for binary subtracting said sixth and seventh binary signals to form an eighth binary signal representing the finished white level with the percentages of white paint, white level and master black being determined by the values of the dividers and so that as the master black level is increased the total white level is decreased a certain percent, and a fourth digital divider coupled to said third means for providing a ninth binary signal representing a second percentage of the selected master black level to the black level controls.

* * * * *

UNITED STATES PATENT AND TRADEMARK OFFICE
CERTIFICATE OF CORRECTION

PATENT NO. : 4,218,699

DATED : August 19, 1980

INVENTOR(S) : Robert A. Dischert, et al.

It is certified that error appears in the above-identified patent and that said Letters Patent is hereby corrected as shown below:

Title sheet, under the heading "Foreign Application Priority Data" that portion reading "May 12, 1978 [GB] United Kingdom ...... 12990/78" should read -- April 3, 1978 [GB] United Kingdom ...... 12990/78 --; Column 1, line 34, that portion reading "CONTROL FOR" should read -- CONTROL SYSTEM FOR --.

Signed and Sealed this

Fourth Day of November 1980

[SEAL]

Attest:

SIDNEY A. DIAMOND

Attesting Officer

Commissioner of Patents and Trademarks